United States Patent
Rosenzweig (10) Patent No.: US 11,810,075 B2
(45) Date of Patent: Nov. 7, 2023

(54) SERVICING OF AUTONOMOUS VEHICLES

(71) Applicant: Ottopia Technologies Ltd., Tel Aviv (IL)

(72) Inventor: Amit Rosenzweig, Tel Aviv (IL)

(73) Assignee: OTTOPIA TECHNOLOGIES LTD., Tel Aviv (IL)

( * ) Notice: Subject to any disclaimer, the term of this patent is extended or adjusted under 35 U.S.C. 154(b) by 574 days.

(21) Appl. No.: 16/734,437

(22) Filed: Jan. 6, 2020

(65) Prior Publication Data
US 2020/0219070 A1    Jul. 9, 2020

Related U.S. Application Data

(60) Provisional application No. 62/788,970, filed on Jan. 7, 2019.

(51) Int. Cl.
| | |
|---|---|
| *G06Q 10/00* | (2023.01) |
| *G06N 20/00* | (2019.01) |
| *G06N 5/04* | (2023.01) |
| *G07C 5/00* | (2006.01) |
| *G07C 5/08* | (2006.01) |
| *G06Q 10/20* | (2023.01) |

(52) U.S. Cl.
CPC .............. *G06Q 10/20* (2013.01); *G06N 5/04* (2013.01); *G06N 20/00* (2019.01); *G07C 5/008* (2013.01); *G07C 5/085* (2013.01)

(58) Field of Classification Search
CPC .......... G06Q 10/20; G06N 5/04; G06N 20/00; G06N 3/08; G06N 5/003; G06N 20/20; G07C 5/008; G07C 5/085; G07C 5/0816
See application file for complete search history.

(56) References Cited

U.S. PATENT DOCUMENTS

| | | | |
|---|---|---|---|
| 9,632,502 B1 | 4/2017 | Levinson et al. | |
| 2016/0311423 A1* | 10/2016 | Storm | B60L 7/08 |
| 2017/0278312 A1* | 9/2017 | Minster | G05D 1/0297 |
| 2018/0281815 A1* | 10/2018 | Stentz | G01C 21/3438 |
| 2018/0356814 A1* | 12/2018 | Brooks | A61B 5/318 |
| 2019/0197798 A1* | 6/2019 | Abari | G06Q 10/02 |
| 2020/0159215 A1* | 5/2020 | Ding | G05D 1/0221 |
| 2020/0184591 A1* | 6/2020 | Balu | G07C 5/006 |

OTHER PUBLICATIONS

S. Neumeier, N. Gay, C. Dannheim and C. Facchi, "On the Way to Autonomous Vehicles Teleoperated Driving," AmE 2018—Automotive meets Electronics; 9th GMM-Symposium, Dortmund, Germany, 2018, pp. 1-6. https://ieeexplore.ieee.org/abstract/document/8402813 (Year: 2018).*

* cited by examiner

*Primary Examiner* — Robert D Rines
*Assistant Examiner* — Alissa D Karmis
(74) *Attorney, Agent, or Firm* — M&B IP Analysts, LLC (57) ABSTRACT

A method includes generating a plurality of training vectors relating to different respective historical service requests generated by respective autonomous vehicles, each of the training vectors including respective features associated with the historical request to which the training vector relates. The method further includes, using the training vectors, training a model configured to generate a prediction relating to one or more future service requests, generating the prediction using the model, and outputting the generated prediction. Other embodiments are also described.

22 Claims, 3 Drawing Sheets

SERVICING OF AUTONOMOUS VEHICLES

CROSS-REFERENCE TO RELATED APPLICATIONS

The present application claims the benefit of U.S. Provisional Application 62/788,970, entitled "Estimating demand for remote assistance of an AV fleet by human operators," filed Jan. 7, 2019, whose disclosure is incorporated herein by reference.

FIELD OF THE INVENTION

The present invention relates to the servicing of autonomous vehicles (AVs).

BACKGROUND

In some cases, an autonomous vehicle, or a passenger riding therein, may require assistance from a remote support staff.

SUMMARY OF THE INVENTION

There is provided, in accordance with some embodiments of the present invention, a system including a data storage and a processor. The processor is configured to retrieve data from the data storage, and to generate, based on the data, a plurality of training vectors relating to different respective historical service requests generated by respective autonomous vehicles, each of the training vectors including respective features associated with the historical request to which the training vector relates. The processor is further configured to, using the training vectors, train a model configured to generate a prediction relating to one or more future service requests. The processor is further configured to generate the prediction using the model, and to output the generated prediction.

In some embodiments, the historical requests include historical requests for assistance issued to a remote support staff, and the future requests include future requests for assistance.

In some embodiments, the historical requests for assistance include historical requests for navigational assistance, and the future requests for assistance include future requests for navigational assistance.

In some embodiments, the prediction includes a predicted number of support-staff members required to service the future requests during a predefined interval of time.

In some embodiments, the historical requests include historical requests for maintenance, and the future requests include future requests for maintenance.

In some embodiments, the prediction includes a start of an interval of time during which a particular one of the vehicles will next generate one of the future requests.

In some embodiments, the prediction is for one of the future requests being generated during a predefined interval of time.

In some embodiments, the prediction includes a predicted number of the future requests during a predefined interval of time.

In some embodiments, the features include weather conditions at a time of the historical request.

In some embodiments, the features include a health score of the autonomous vehicle that generated the historical request at a time of the historical request.

There is further provided, in accordance with some embodiments of the present invention, a method including generating a plurality of training vectors relating to different respective historical service requests generated by respective autonomous vehicles, each of the training vectors including respective features associated with the historical request to which the training vector relates. The method further includes, using the training vectors, training a model configured to generate a prediction relating to one or more future service requests. The method further includes generating the prediction using the model, and outputting the generated prediction.

There is further provided, in accordance with some embodiments of the present invention, a computer software product including a tangible non-transitory computer-readable medium in which program instructions are stored. The instructions, when read by a processor, cause the processor to generate a plurality of training vectors relating to different respective historical service requests generated by respective autonomous vehicles, each of the training vectors including respective features associated with the historical request to which the training vector relates. The instructions further cause the processor to, using the training vectors, train a model configured to generate a prediction relating to one or more future service requests. The instructions further cause the processor to generate the prediction using the model, and to output the generated prediction.

The present invention will be more fully understood from the following detailed description of embodiments thereof, taken together with the drawings, in which:

DETAILED DESCRIPTION OF EMBODIMENTS

Overview

In general, it is challenging to service a fleet of autonomous vehicles effectively and cost-efficiently. For example, if the support staff assisting with the navigation of the vehicles is too small, requests for assistance may not be handled in a timely fashion; on the other hand, if the staff is too large, resources may be wasted on idle personnel. Moreover, it may be challenging for the support-staff members to remain attentive throughout their shifts, such that response times may be compromised. Additionally, vehicles may unexpectedly require maintenance.

To address these challenges, embodiments of the present invention use machine-learning techniques to predict the number, type, and/or timing of future service requests. In particular, a processor collects data relating to past service requests, including historical data (e.g., historical weather conditions) that are likely to be correlated with the number, type, and/or timing of the requests. Using the data, the processor trains a model configured to generate predictions based on relevant current and forecasted data (e.g., current and forecasted weather conditions). Subsequently, the model may be used to generate useful predictions.

Thus, for example, the processor may predict (or "estimate") a required number of support-staff members during a predefined future interval of time, such as an upcoming interval of several hours, the next day, the next week, or the next month. Alternatively or additionally, for example, the processor may ascertain that a particular vehicle is likely to generate a service request soon, such that the relevant personnel may be placed on alert.

System Description

Figure 1:
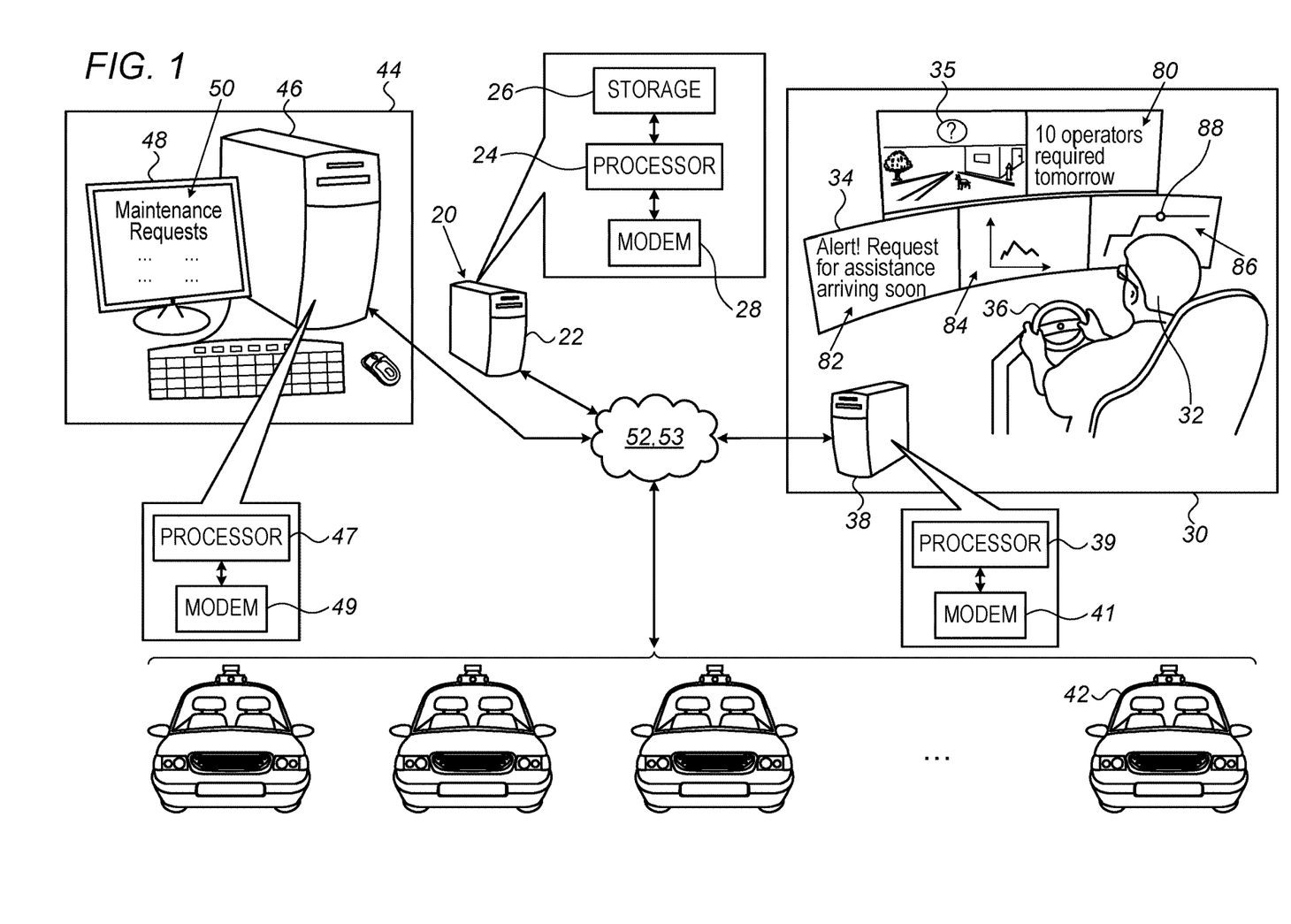
FIG. 1 is a schematic illustration of a system for improving the servicing of autonomous vehicles, in accordance with some embodiments of the present invention.

Reference is initially made to FIG. 1, which is a schematic illustration of a system 20 for improving the servicing of autonomous vehicles 42, in accordance with some embodiments of the present invention.

FIG. 1 depicts a fleet of vehicles 42, each vehicle comprising a self-driving car, van, truck, bus, tractor, train, shuttle, trolley, forklift, platform, or any other type of vehicle, which may transport people, luggage, merchandise, and/or any other items. Typically, each vehicle comprises one or more imaging sensors, such as one or more cameras, a Light Detection and Ranging (LIDAR) sensor, a radar imager, and/or an ultrasonic imager. Typically, each vehicle further comprises other sensors for tracking the location, orientation, speed, and/or acceleration of the vehicle, such as an accelerometer and/or a Global Positioning System (GPS) sensor, and/or for monitoring the health of the various subsystems of the vehicle.

FIG. 1 further depicts a remote support center 30, which is staffed by human support-staff members 32, who may also be referred to as "teleoperators" or simply as "operators." Support center 30 contains a support server 38 comprising a processor 39 and a communication interface, such as a modem 41. Processor 39 is configured to perform the functionality of support server 38 described herein, including, for example, exchanging communication via modem 41.

For example, as the sensors of each vehicle acquire images of the vehicle's environment and/or other data relating to the navigation of the vehicle (e.g., the vehicle's speed and acceleration), the vehicle may communicate the data over a network 52, such as a cellular network and/or the Internet 53, to support server 38. In addition, via network 52, the vehicle may communicate any requests for assistance to support server 38. Based on the received data and requests for assistance, support server 38 may generate audio and/or visual outputs to support-staff members 32.

For example, upon encountering a hazard on the road, a vehicle may require navigational assistance from a support-staff member. Accordingly, the vehicle may communicate an image of the hazard, along with a request for navigational assistance, to the support server. In response thereto, the support server may display the image, along with the request for navigational assistance (depicted schematically in FIG. 1 by a question mark 35), on a display 34. In response to viewing the image and the request, a staff member 32 may perform a control action for navigating the vehicle. For example, the staff member may turn a steering wheel 36, or input navigational instructions to the vehicle via a suitable user interface. In response to the control action, support server 38 may communicate appropriate instructions to the vehicle. For example, in response to the staff member turning steering wheel 36 to the left, the support server may instruct the vehicle to turn left.

As another example, a passenger riding in one of the vehicles may generate a request for assistance, e.g., by pushing a "help" button located in the vehicle. In response thereto, the vehicle may communicate the request to the support server. In response to receiving the request, the support server may generate a suitable audio and/or visual output to the support staff, and then establish audio contact between a support-staff member 32 and the passenger such that the support-staff member may communicate with the passenger.

Typically, remote support center 30 contains multiple displays 34 for simultaneously displaying data and requests from different respective autonomous vehicles. Any number of support-staff members may monitor displays 34.

FIG. 1 further depicts a remote health-monitoring center 44, which contains a health-monitoring server 46 comprising a processor 47 and a communication interface, such as a modem 49. Processor 47 is configured to perform the functionality of health-monitoring server 46 described herein, including, for example, exchanging communication via modem 49.

For example, as the sensors of each vehicle acquire health data relating to the health of the vehicle, the vehicle may communicate the health data, via network 52, to health-monitoring server 46. In addition, the vehicle may communicate via the network, to the health-monitoring server, any requests for maintenance of the vehicle. Each such request may be generated by the vehicle itself or by a passenger riding therein. For example, the vehicle or the passenger may generate a request to recharge the vehicle, to refill the vehicle with washer fluid, or to fix the vehicle's audio subsystem.

Based on the received health data, health-monitoring server 46 may compute various health scores for the fleet. For example, based on data relating to the health of a subsystem (e.g., the braking subsystem) of a particular vehicle (the data including, for example, the thickness of the vehicle's brake pads), the health-monitoring server may compute a health score for the subsystem. Additionally, based on the respective scores for the various subsystems of the vehicle, the health-monitoring server may compute an overall health score for the vehicle; for example, the health-monitoring server may compute the overall score by averaging the subsystem scores. Optionally, the health-monitoring server may further compute an overall health score for the fleet, e.g., by averaging the respective scores of the vehicles belonging to the fleet. Alternatively or additionally, some health scores may be computed by the vehicles themselves, and these scores may be included in the health data received by the health-monitoring server.

(It is noted that the health scores may be based on other information not included in the received health data, such as the respective ages of the vehicles. Each health score may be expressed quantitatively or qualitatively on any suitable scale, such as a scale of 1-10 or a scale of "poor," "fair," and "excellent.")

Alternatively or additionally, in response to receiving the maintenance requests, health-monitoring server 46 may generate appropriate audio and/or visual output to the relevant maintenance personnel, such that the maintenance personnel may perform the required maintenance. For example, the health-monitoring server may aggregate all the outstanding requests into a list 50 and then display list 50 on a display 48.

System 20 comprises a server 22, comprising a processor 24. As described in detail below with reference to FIG. 2, processor may receive historical data from any number of sources, including support server 38 and/or health-monitoring server 46, and train predictive models using the received historical data. As described in detail below with reference to FIG. 3, using the models, the processor may generate various predictions that improve the servicing of vehicles 42. The predictions may be communicated over network 52 to support server 38 and/or to health-monitoring server 46.

Typically, server 22 further comprises a communication interface, such as a modem 28, for communicating over network 52. Via modem 28, processor 24 may be cooperatively networked with any number of other processors, such as processor 39 and processor 47. Server 22 may further comprise a data storage 26, such as a hard drive and/or a flash drive, for storing any received data, any trained predictive models, and/or any predictions. Alternatively, data storage 26 may be located remotely from server 22.

In some embodiments, as depicted in FIG. 1, server 22 resides outside of support center 30 and health-monitoring center 44, such as in a cloud-computing facility. In such embodiments, server 22 may generate predictions for multiple fleets of autonomous vehicles serviced by different respective support and health-monitoring centers. In other embodiments, server 22 may reside at support center 30 or at health-monitoring center 44.

As yet another alternative, system 20 may not comprise a separate server 22; rather, support server 38 or health-monitoring server 46 may perform the functionality of server 22 described herein.

In some embodiments, support server 38 and health-monitoring server 46 are identical, i.e., a single server performs both support and health-monitoring.

In general, each of the processors described herein may be embodied as a single processor, or as a cooperatively networked or clustered set of processors. In some embodiments, the functionality of each processor, as described herein, is implemented solely in hardware, e.g., using one or more Application-Specific Integrated Circuits (ASICs) or Field-Programmable Gate Arrays (FPGAs). In other embodiments, the functionality of at least one of the processors is implemented at least partly in software. For example, in some embodiments, a processor is embodied as a programmed digital computing device comprising at least a central processing unit (CPU) and random access memory (RAM). Program code, including software programs, and/or data are loaded into the RAM for execution and processing by the CPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Training a Predictive Model

Figure 2:
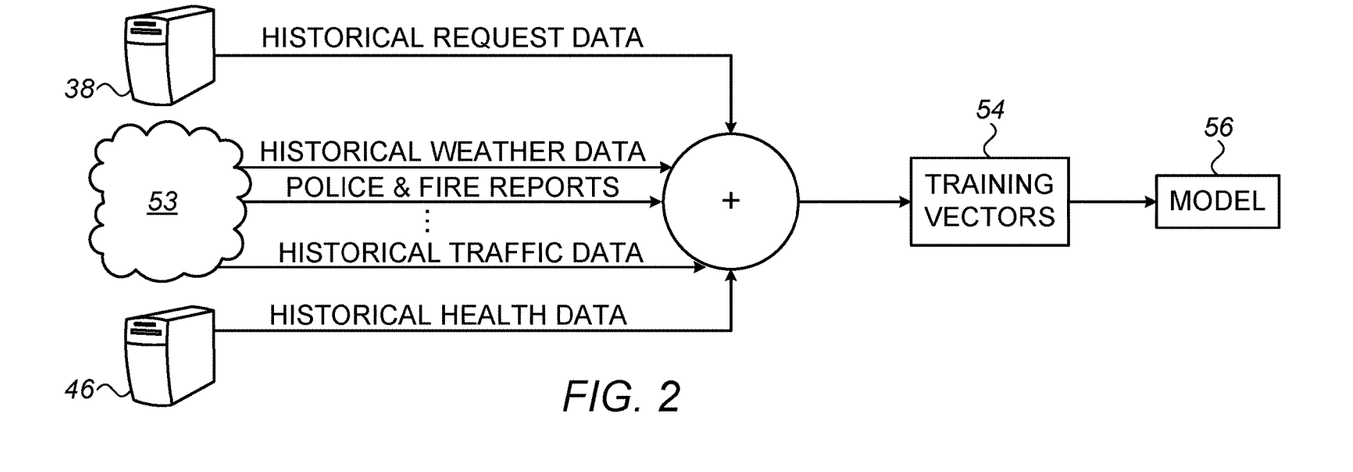
FIG. 2 is a schematic illustration of a technique for training a predictive model, in accordance with some embodiments of the present invention.

Reference is now made to FIG. 2, which is a schematic illustration of a technique for training a predictive model, in accordance with some embodiments of the present invention.

As described above with reference to FIG. 1, processor 24 is configured to receive historical data from one or more sources.

For example, the processor may receive historical request data from support server 38. The historical request data may include features of each historical request for assistance communicated to support center 30 (FIG. 1), such as, for example, the type of assistance requested, the date and time of the request, the location, speed, and acceleration of the vehicle when the request was made, the route the vehicle was following when the request was made (including the vehicle's origin and destination), the make and model (including a version number, if applicable) of the vehicle, a profile of the passenger(s) riding in the vehicle (if the vehicle was occupied), and/or the amount of time that was required to service the request.

Alternatively or additionally, the processor may receive historical health data from health-monitoring server 46. The historical health data may include the overall health score of the fleet, the overall health score of each vehicle in the fleet, and/or the health scores of respective subsystems of one or more vehicles, at various points in time. Alternatively or additionally, the historical health data may include features of historical requests for maintenance communicated to the health-monitoring server, including, for example, the type of maintenance requested, the date and time of the request, the location, speed, and acceleration of the vehicle when the request was made, the route the vehicle was following when the request was made, and/or the make and model of the vehicle.

Alternatively or additionally, the processor may receive other relevant historical data from Internet 53 (e.g., from online news outlets) or from any other suitable source. Such data may include, for example, historical weather data, reports relating to historical activity issued by the police, the fire department, and other emergency services, and/or historical traffic data.

By aggregating and correlating the received historical data, the processor generates a plurality of training vectors 54 relating to different respective historical requests to service the autonomous vehicles. Each training vector 54 includes multiple features associated with the historical request to which the training vector relates. As illustrated in the examples below, each feature may be numeric, descriptive, or Boolean, or may have any other suitable form.

For example, training vectors 54 may relate to different respective historical requests for assistance issued to the remote support staff. As a purely illustrative example, Table 1 below includes two hypothetical training vectors of this nature:

TABLE 1

| TYPE OF REQUESTED ASSISTANCE | OTHER REQUEST FEATURES | WEATHER CONDITIONS | DISTURBANCE IN AREA (Y/N) | HEALTH SCORE (1-10) |
|---|---|---|---|---|
| Navigational | (. . .) | Snowy | N | 8 |
| Passenger | (. . .) | Clear | N | 10 |

The first of these hypothetical training vectors relates to a request for navigational assistance generated by the vehicle, while the second relates to a request to communicate with a passenger. Each training vector includes, in addition to the type of requested assistance, other features of the request, such as the date and time of the request and/or the various other features delineated above. Other features associated with the request are the weather conditions at the time of the request, the presence or absence of a traffic-related disturbance (e.g., a road accident, a fire, or a street festival) in the area of the vehicle at the time of the request, and the health score of the vehicle at the time of the request. (Alternatively or additionally to the health score of the vehicle, the training vector may include respective health scores of various subsystems of the vehicle, or the overall health score of the fleet.)

Alternatively or additionally, training vectors 54 may relate to different respective historical requests for maintenance. As a purely illustrative example, Table 2 below includes two hypothetical training vectors of this nature:

TABLE 2

| TYPE OF REQUESTED MAINTENANCE | OTHER REQUEST FEATURES | WEATHER CONDITIONS | DISTURBANCE IN AREA (Y/N) | HEALTH SCORE (1-10) |
|---|---|---|---|---|
| Audio | (...) | Clear | N | 5 |
| Brakes | (...) | Rainy | N | 6 |

The first of these hypothetical training vectors relates to a request for maintenance of the audio subsystem of the vehicle, while the second relates to a request for maintenance of the vehicle's brakes. Each training vector includes, in addition to the type of maintenance requested, other features associated with the request, as described above with reference to Table 1. (Typically, for a training vector relating to a maintenance request, the health score included in the vector is specific to the subsystem for which maintenance was requested.)

Subsequently to generating the training vectors, the processor uses the training vectors to train a predictive model 56. In particular, the processor feeds the training vectors to the model such that the model learns the manner in which the features represented in the training vectors correlate with the number, type, and/or timing of the historical requests. Thus, the model may generate predictions relating to the number, type, and/or timing of future requests.

For example, the model may learn that a larger number of requests for assistance are generated during particular periods of the year or hours of the day, during particular weather conditions, at particular locations (e.g., on particular streets or at particular street corners), or in the vicinity of particular types of disturbances. The correlation of the number of requests with some of these features, such as the date and time, may be at least partly explained by greater demand for the autonomous vehicles. For example, demand for the autonomous vehicles may be greater during rush hour, and hence the number of requests may be greater during rush hour.

As another example, the model may learn the manner in which the make and model (referred to below simply as the "type") of the vehicle correlates with the number and timing of service requests generated by the vehicle. For example, the model may learn that in response to detecting a hazard, a first type of vehicle generates a request for navigational assistance, on average, three seconds prior to a second type of vehicle, or that, given the same health score, the former type is more likely than the latter type to generate a request for maintenance.

As yet another example, the model may learn that elderly passengers are more likely than younger passengers to generate requests for assistance.

Typically, model 56 includes a neural network, such as a neural network regressor. Alternatively, the model may include another type of machine-learned model, such as a random forest regressor.

Generating a Prediction

Following the training, model 56 is configured to generate a prediction relating to one or more future service requests, such as future requests for assistance (e.g., navigational assistance) or future requests for maintenance. In this regard, reference is now made to FIG. 3, which is a schematic illustration of a technique for using model 56 to generate predictions, in accordance with some embodiments of the present invention.

Figure 3:
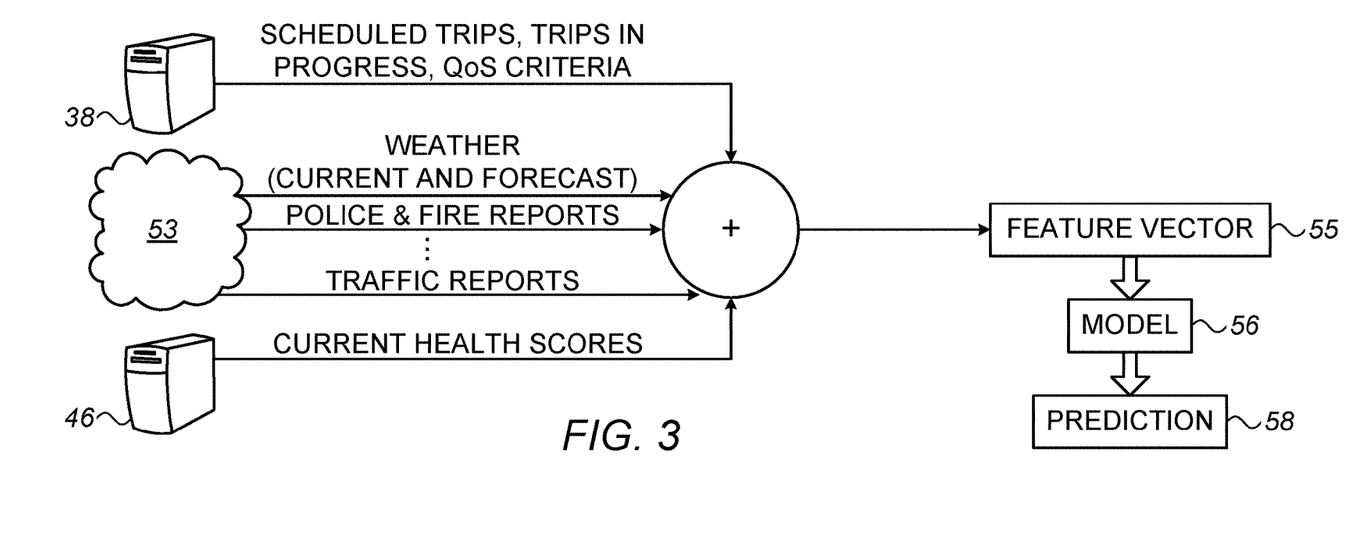
FIG. 3 is a schematic illustration of a technique for using a predictive model to generate predictions, in accordance with some embodiments of the present invention.

Subsequently to training model 56, processor 24 (FIG. 1) may continually receive, from any number of sources, data relevant to the type of prediction generated by the model. For example, the processor may receive, from support server 38, a list of scheduled trips and/or trips in progress. The processor may further receive, from support server 38, Quality of Service (QoS) criteria. Such criteria may include, for example, a minimum required percentage of requests for assistance that are to be answered by the support staff, and/or a maximum allowed wait time when servicing such requests.

Alternatively or additionally, the processor may receive (e.g., from Internet 53) current and forecasted weather conditions, reports of current activity issued by the police, the fire department, and other emergency services, and/or reports of current traffic conditions. Such reports—which may include, for example, a listing of road closures and/or locations at which emergency services or hazards are present—may be obtained from online news outlets or may be crowdsourced, e.g., from traffic-related applications such as Waze.

Alternatively or additionally, the processor may receive, from health-monitoring server 46, the current health score of the fleet, the current respective health scores of one or more vehicles in the fleet, and/or the current respective health scores of one or more subsystems of one or more of the vehicles.

By aggregating and correlating the received data, the processor generates a feature vector 55. Subsequently, the processor inputs vector 55 to model 56. In response to the vector, the model generates a prediction 58 relating to one or more future requests for service. For example:

(a) The model may predict the number of requests for assistance from the fleet during a predefined upcoming interval. For this prediction, the processor may generate a vector including, for example, (i) the start date and time, and end date and time, of the interval, (ii) properties of each trip scheduled to begin or to continue during the interval, including the origin, the destination, the start time of the trip, the make, model, and health score of the vehicle conducting the trip or assigned to the trip (if a vehicle has indeed been assigned), a profile of the passenger(s) currently riding or scheduled to ride in the vehicle (if relevant), and/or streets likely to be traversed during the trip, (iii) current and/or forecasted weather conditions, (iv) any locations at which traffic-related disturbances are ongoing or anticipated, and/or (v) the health score of the fleet. The processor may then input the vector to the model, such that the model generates the prediction.

Optionally, the model may include two sub-models: a first sub-model configured to predict the number of requests as described above, and a second sub-model configured to predict the number of support-staff members required to service the requests. In addition to the predicted number of requests, relevant inputs to the second sub-model may include QoS criteria received from support server 38 (or from any other source) and/or relevant historical data, such as the average amount of time required to service historical requests.

As a specific example, the second sub-model may assume that requests for assistance arrive at the support center in accordance with a Poisson distribution whose rate $\lambda$ may be computed from the number of requests predicted by the first sub-model. Subsequently, given λ and μ, the average amount of time required to service the historical requests, the second sub-model may apply the Erlang-B or Erlang-C formula to compute the number of staff members required to satisfy the QoS criteria.

(b) The model may predict the number of requests for maintenance from the fleet during a predefined upcoming interval. For this prediction, the processor may generate a vector including, for example, (i) the start date and time, and end date and time, of the interval, (ii) properties of each trip scheduled to begin or to continue during the interval (e.g., as described above), (iii) current and/or forecasted weather conditions, and/or (iv) the health score of the fleet. The processor may then input the vector to the model, such that the model generates the prediction.

It is noted that in the context of the present application, including the claims, any reference to a "number" may include, within its scope, a range of numbers. Thus, for example, model 56 may output a predicted range for the future service requests or required support-staff members. Moreover, the model may output multiple numbers or ranges of numbers with different respective likelihoods or levels of confidence. For example, the model may calculate a likelihood of 95% that the number of requests will be between 120 and 160, and a likelihood of 75% that the number of requests will be between 135 and 150. As another example, the model may calculate a likelihood of 99% that ten support-staff members will be sufficient to handle the upcoming requests for assistance, and a likelihood of 80% that eight will be sufficient.

(c) The model may predict that a particular vehicle will generate a service request (e.g., a request for assistance or a request for maintenance) during a predefined upcoming interval of time, or predict the start of an interval during which the vehicle will next generate a service request. For this prediction, the processor may generate a vector including, for example, (i) the current location, speed, and acceleration of the vehicle, (ii) properties of each trip that the vehicle is scheduled to begin or to continue, (iii) current and/or forecasted weather conditions, (iv) any locations at which traffic-related disturbances are ongoing or anticipated, and/or (v) the make, model, and health score of the vehicle. The processor may then input the vector to the model, such that the model generates the prediction.

For example, given a predefined upcoming interval, the model may compute, based on the vector, a probability of the vehicle generating a service request during the interval, and then generate the prediction in response to the probability exceeding a predefined threshold.

Alternatively, to predict the start of an interval during which the vehicle will generate its next service request, the model may compute a probability density function (PDF) expressing the probability density, as a function of time, for the occurrence of the next service request, and then return the earliest time at which the PDF exceeds a predefined threshold.

Alternatively or additionally to the start of the interval, the processor may predict the end of the interval, and/or a location or area at which the next service request will be generated. For example, given the vehicle's current location, speed, and acceleration, the processor may ascertain that the vehicle is approaching a problematic street corner at which a relatively large number of historical requests for assistance were generated. Accordingly, the processor may predict that the vehicle will generate a request for assistance, upon reaching the street corner, between x and x+T seconds from the current time.

More generally, it is noted that a prediction may be generated in response to any subset of the features described herein and/or in response to other inputs computed from relevant historical data. Such inputs may include, for example, statistics relating to historical demand for the fleet (e.g., the average historical demand per week or month), to trip routes and/or durations (e.g., the frequency with which a route passes through a particular street corner, or the average duration of a trip), and/or to the frequency of the historical requests (e.g., an average number of requests per trip or per day).

Alternatively or additionally to the types of predictions described above, the processor may use a machine-learned model to predict, for a predefined future interval, demand for the fleet (e.g., a total number of trips, or a number of autonomous vehicles on the road as a function of time), trip origins, destinations, or routes, a total number of vehicle-miles or vehicle-minutes, total person-hours required to assist the vehicles, revenues, costs, and/or any other relevant parameters.

In some embodiments, predictions are generated separately for different respective request subtypes, for different respective makes and models of vehicles, for different respective types of trips (e.g., single-route passenger, multi-route passenger, and package-delivery), and/or for different respective geographic areas in which the fleet operates. For example, the processor may predict a first number of support-staff members required to service future requests for navigational assistance via direct control (e.g., using steering wheel 36 (FIG. 1)), a second number of support-staff members required to service future requests for navigational assistance via interactions with the vehicles' subsystems, and a third number of support-staff members required to service future requests to communicate with passengers. To facilitate this, separate training procedures using different respective sets of historical data may be performed, such that multiple specialized models are trained. Alternatively, a single model may be trained to differentiate between the different request subtypes, vehicle makes and models, trip types, and/or geographic areas.

Outputting the Prediction

Reference is again made to FIG. 1.

Subsequently to using the model to generate the prediction, the processor outputs the prediction. For example, the processor may output the prediction by communicating the prediction to support server 38 or to maintenance server 46. Alternatively or additionally, the processor may output a message on a display (such as display 34 or display 48), and/or generate an audio output, indicating the prediction. Alternatively or additionally, the processor may output the prediction to data storage 26, such that the prediction is stored in the data storage.

For example, the processor may communicate a predicted number of requests for assistance or a predicted number of required support-staff members to the support server. In response to receiving the predicted number, the support server may output a message 80 on display 34 indicating the predicted number. In response to the message, the required number of persons may be called in to support center 30.

As another example, the processor may communicate a prediction that a particular vehicle will generate a request for assistance during a predefined upcoming interval, or the start time of an interval during which the vehicle is predicted to generate its next request for assistance, to the support server. In response to receiving this prediction, the support server may output a message 82 on display 34, output an audio alert (e.g., by playing an alarm sound), and/or output another visual alert (e.g., by flashing a light), notifying the support staff that a request for assistance is arriving soon. (It is noted that the support server—or processor 24—may output the prediction only if the start of the interval is within a predefined offset from the current time.) Advantageously, given this advance warning, the support staff may respond more quickly to the request when the request occurs.

Optionally, message 82 may specify the start of the interval during which the request for assistance is anticipated. For example, given a start time that is ten seconds from the current time, message 82 may state "ALERT! Request for assistance arriving in 10 seconds." Subsequently, the support server may continually update the message to count down the time, until the message simply states "ALERT! Request for assistance imminent." Subsequently to the predicted request being generated, or in response to the end time of the interval passing without the occurrence of the predicted request, the message may be removed from the display. Similarly, in the event that the processor predicted a request at a particular location or area, the message may be removed in response to the vehicle passing through the location or area without generating the predicted request.

As another example, the processor may communicate a predicted number of requests for maintenance to the health-monitoring server. In response to receiving the predicted number, the health-monitoring server may output a message on display 48 indicating the predicted number. In response to the message, the relevant maintenance personnel may be alerted to the predicted upcoming requests.

As another example, the processor may communicate, to the health-monitoring server, a prediction that a particular vehicle will generate a request for maintenance during a predefined upcoming interval. In response to receiving this prediction, the health-monitoring server may output a message on display 48 indicating the prediction. Advantageously, given this advance warning, the maintenance staff may respond more quickly to the request, or preemptively perform the required maintenance before the request is generated.

As yet another example, the processor may communicate, to the support server or to the health-monitoring server, the probability of a request occurring during an upcoming interval, or multiple probabilities for different respective intervals. As a purely illustrative example, the processor may communicate a 70% probability of a request within the next 10 seconds, an 80% probability of a request within the next 20 seconds, and a 90% probability of a request within the next 30 seconds.

In some cases, a prediction may be displayed as a graph 84 that plots a predicted number, such as a number of required support-staff members, a number of autonomous vehicles on the road, or a cumulative number of vehicle-miles, as a function of time. Alternatively or additionally, a prediction may be displayed as one or more numbers, icons, or other symbols overlaid on a map. For example, a map 86 of a vehicle's current route may be displayed, together with an overlaid marker 88 marking a location or an area (e.g., a street corner or stretch of road) at which a service request is predicted. As another example, a map of one or more geographic areas may be displayed, together with overlaid markers marking routes scheduled or predicted for an upcoming interval, and/or locations at which service requests are predicted. Alternatively or additionally, one or more predicted numbers, such as a predicted number of service requests or of required vehicles, may be overlaid over each geographic area.

Example Architecture

Figure 4:
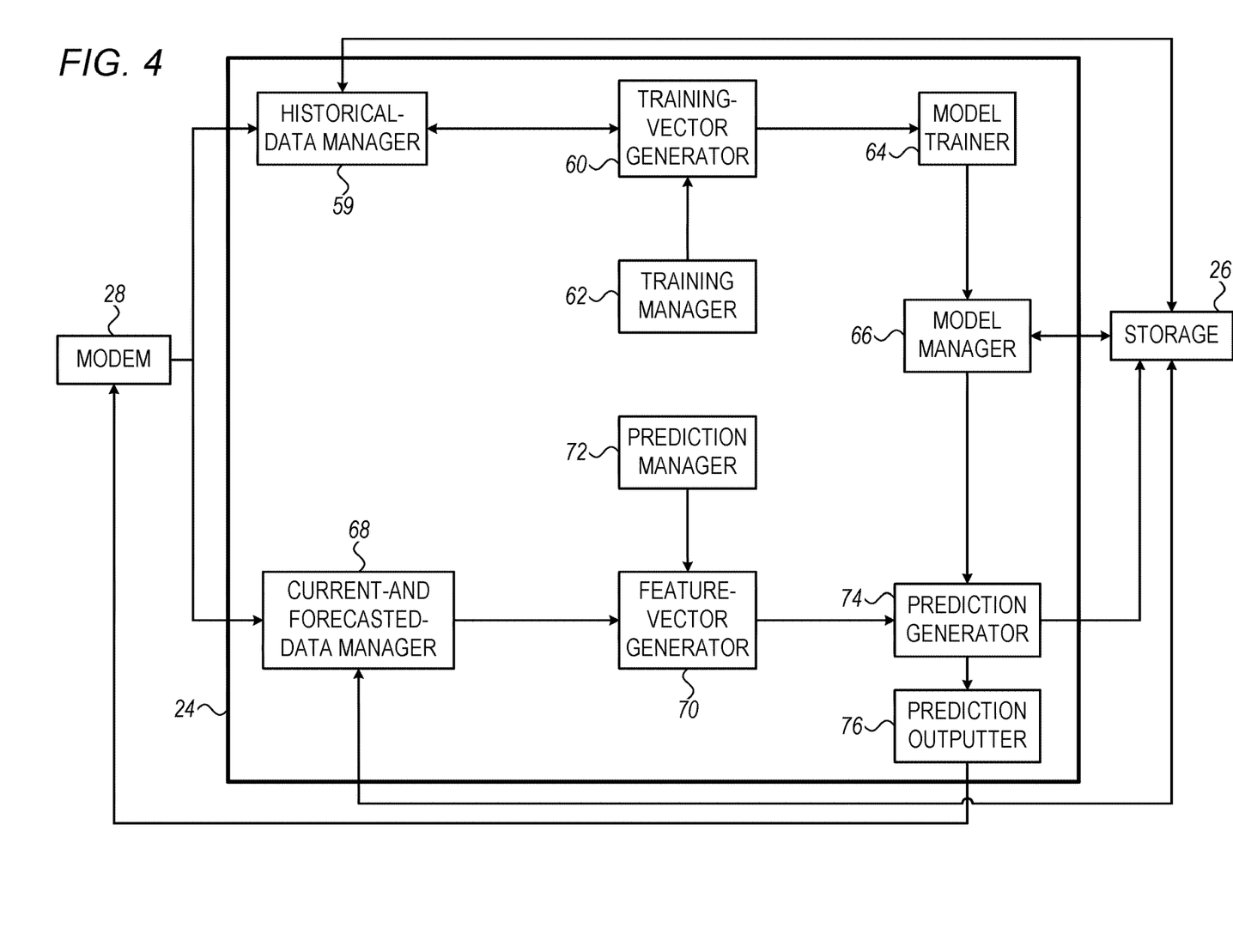
FIG. 4 is an example module diagram, in accordance with some embodiments of the present invention.

Reference is now made to FIG. 4, which is an example module diagram, in accordance with some embodiments of the present invention.

Typically, the functionality of processor 24 is divided across multiple modules, each of which may be implemented in hardware, software, or any suitable combination of hardware and software elements. By way of illustration, FIG. 4 shows one way in which such a division may be implemented. Each module shown in FIG. 4 is hereby described.

In some embodiments, a historical-data manager 59 manages the flow of historical data, such as the types of data described above with reference to FIG. 2. For example, historical-data manager 59 may receive historical data via modem 28 and/or via any other suitable communication interface, such as a flash-drive interface. The historical-data manager may further process the data as required (e.g., by extracting relevant features), and then store the processed data in data storage 26. The historical-data manager may further retrieve the data from the data storage as required, as further described below.

In general, the historical-data manager may receive data passively (via a "push") or actively (via a "pull"). As an example of a passive receipt of data, the historical-data manager may receive data from support server 38 periodically, and/or receive a forwarded copy of each request immediately following receipt of the request by the support server. As an example of an active receipt of data, the historical-data manager may operate a web crawler configured to glean relevant historical data from the Internet.

In some embodiments, a training-vector generator 60 generates training vectors 54 (FIG. 2) in response to instructions from a training manager 62. For example, training manager 62 may specify a type of model to be trained—e.g., a model for predicting a number of required support-staff members—and the features that are to be represented in the training vectors. In response to these specifications, training-vector generator 60 may request the relevant data from the historical-data manager, and the historical-data manager may then retrieve the requested data from the data storage. Subsequently to receiving the data from the historical-data manager, the training-vector generator may generate the training vectors from the data.

In some embodiments, subsequently to generating the training vectors, the training-vector generator passes the training vectors, along with the type of model specified by the training manager, to a model trainer 64. Subsequently, model trainer 64 uses the training vectors to train a model.

In general, the training manager may initiate the training or retraining of a model at any suitable time. Thus, for example, a model may be retrained periodically, using newly-received historical data in combination with previously-received historical data. In some embodiments, the training-vector generator passes any newly-generated training vectors to the historical-data manager, and the historical-data manager then stores these training vectors in storage 26. Subsequently, to retrain a model, the historical-data manager retrieves the training vectors along with any newly-received historical data, and then passes these items to the training-vector generator. The training-vector generator then generates new training vectors from the newly-received historical data, appends the new training vectors to the pre-existing training vectors, and then passes the full set of training vectors to the model trainer.

In some embodiments, subsequently to training a model, the model trainer passes the model to a model manager 66. Model manager 66 may then store the model in data storage 26.

In some embodiments, a current-and-forecasted-data manager 68 manages the flow of current and forecasted data, such as the types of data described above with reference to FIG. 3. Such data may be received passively or actively via modem 28 and/or via any other suitable communication interface, such as a flash-drive interface. Current-and-forecasted-data manager 68 may further process the data as required, and then store the processed data in data storage 26. The current-and-forecasted-data manager may further retrieve the data from the data storage as required, as further described below.

In some embodiments, a feature-vector generator 70 generates feature vectors 55 (FIG. 3) in response to instructions from a prediction manager 72. For example, prediction manager 72 may specify a type of prediction to be generated—e.g., a prediction for a number of required support-staff members—and the features that are to be represented in the feature vector. In response to these specifications, feature-vector generator 70 may request the relevant data from the current-and-forecasted-data manager, and the current-and-forecasted-data manager may then retrieve the requested data from the data storage. Subsequently to receiving the data from the current-and-forecasted-data manager, the feature-vector generator may generate the feature vector.

In some embodiments, subsequently to generating the feature vector, the feature-vector generator passes the feature vector, along with the type of prediction specified by the prediction manager, to a prediction generator 74. Subsequently, prediction generator 74 requests the required model from model manager 66. In response thereto, the model manager retrieves the model from the data storage and passes the model to the prediction generator. Subsequently, the prediction generator uses the model to generate the prediction.

In general, the frequency with which prediction manager 72 initiates a prediction varies between different types of predictions. For example, while a vehicle is in operation, the prediction manager may instruct the feature-vector generator to generate an updated feature vector—including, for example, the current location, speed, and acceleration of the vehicle—relatively frequently, e.g., with a period of between five seconds and one minute. Each updated feature vector may be passed to prediction generator 74, and the prediction generator may then predict the start time of the interval during which the vehicle will generate its next request for assistance, or ascertain whether the vehicle is likely to request assistance during a predefined upcoming interval (e.g., within the next 10 seconds). On the other hand, a prediction for a required number of support-staff members may be initiated less frequently. For example, the prediction may be initiated (and generated) at the end of each day to ascertain the number of staff members required for the next day, and/or several (e.g., 2-5) times per day to ascertain the number of staff members required for various shifts, or periods of peak demand, during the day.

In some embodiments, subsequently to generating a prediction, the prediction generator passes the prediction to a prediction outputter 76. In response to receiving the prediction, prediction outputter 76 may output the prediction, e.g., via modem 28, as described above with reference to FIG. 1. Typically, the prediction generator also stores the prediction in data storage 26.

It is emphasized that the architecture shown in FIG. 4 is provided by way of example only, and that any suitable architecture is included within the scope of the present invention.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
a data storage; and
a processor, configured to:
retrieve data from the data storage;
based on the data, generate a plurality of training vectors relating to different respective historical service requests generated by respective autonomous vehicles, each of the training vectors including respective features associated with the historical request to which the training vector relates;
using the training vectors, train a model configured to generate a plurality of types of predictions relating to one or more future service requests, wherein the plurality of types of predictions includes a first type of prediction and a second type of prediction;
generate at least one updated feature vector based on newly received historical service requests;
generate a plurality of new training vectors based on the at least one updated feature vector;
return the model using the generated plurality of new training vectors in order to create a retrained model, wherein generating the predictions of the first type of prediction further comprises passing the first updated feature vectors to the retrained model; and
using the retrained model, generate predictions of the first type of prediction at a first frequency;
using the retrained model, generate the predictions of the second type of prediction at a second frequency, wherein the first frequency is higher than the second frequency; and
output the generated plurality of predictions.

2. The system according to claim 1, wherein the historical requests include historical requests for assistance issued to a remote support staff, and wherein the future service requests include future requests for assistance.

3. The system according to claim 2, wherein the historical requests for assistance include historical requests for navigational assistance, and wherein the future requests for assistance include future requests for navigational assistance.

4. The system according to claim 2, wherein the prediction includes a predicted number of support-staff members required to service the future requests during a predefined interval of time.

5. The system according to claim 1, wherein the historical requests include historical requests for maintenance, and wherein the future requests include future requests for maintenance.

6. The system according to claim 1, wherein the prediction includes a start of an interval of time during which a particular one of the vehicles will next generate one of the future requests.

7. The system according to claim 1, wherein the prediction is for one of the future requests being generated during a predefined interval of time.

8. The system according to claim 1, wherein the prediction includes a predicted number of the future requests during a predefined interval of time.

9. The system according to claim 1, wherein the features include a health score of the autonomous vehicle that generated the historical request at a time of the historical request.

10. The system of claim 1, wherein the at least one updated feature vector includes first updated feature vectors and second updated feature vectors, wherein the processor is further configured to:
generate the first updated feature vectors each including a first set of features at the first frequency, wherein generating the predictions of the first type of prediction further comprises passing the first updated feature vectors to the retrained model; and
generate the second updated feature vectors each including a second set of features at the second frequency, wherein generating the predictions of the second type of prediction further comprises passing the second updated feature vectors to the retrained model.

11. The system of claim 10, wherein each first feature vector and each second feature vector passed to the retrained model is passed along with a type of prediction to be generated by the model using the passed feature vector.

12. A method, comprising:
generating a plurality of training vectors relating to different respective historical service requests generated by respective autonomous vehicles, each of the training vectors including respective features associated with the historical request to which the training vector relates;
using the training vectors, training, by a processor, a model configured to generate a plurality of types of predictions relating to one or more future service requests, wherein the plurality of types of predictions includes a first type of prediction and a second type of prediction;
generating at least one updated feature vector based on newly received historical service requests;
generating a plurality of new training vectors based on the at least one updated feature vector;
retraining the model using the generated plurality of new training vectors in order to create a retrained model, wherein generating the predictions of the first type of prediction further comprises passing the first updated feature vectors to the retrained model; and
using the retrained model, generating predictions of the first type of prediction at a first frequency;
using the retrained model, generating the predictions of the second type of prediction at a second frequency, wherein the first frequency is higher than the second frequency; and
outputting the generated plurality of predictions.

13. The method according to claim 12, wherein the historical requests include historical requests for assistance issued to a remote support staff, and wherein the future requests include future requests for assistance.

14. The method according to claim 13, wherein the historical requests for assistance include historical requests for navigational assistance, and wherein the future requests for assistance include future requests for navigational assistance.

15. The method according to claim 13, wherein the prediction includes a predicted number of support-staff members required to service the future requests during a predefined interval of time.

16. The method according to claim 12, wherein the historical requests include historical requests for maintenance, and wherein the future requests include future requests for maintenance.

17. The method according to claim 12, wherein the prediction includes a start of an interval of time during which a particular one of the vehicles will next generate one of the future requests.

18. The method according to claim 12, wherein the prediction is for one of the future requests being generated during a predefined interval of time.

19. The method according to claim 12, wherein the prediction includes a predicted number of the future requests during a predefined interval of time.

20. The method according to claim 12, wherein the features include a health score of the autonomous vehicle that generated the historical request at a time of the historical request.

21. The method of claim 12, wherein the first type of prediction relates to a time at which one of the autonomous vehicles will generate a next service request, wherein the second type of prediction relates to a predicted number of support staff members required during a given period of time.

22. A computer software product comprising a tangible non-transitory computer-readable medium in which program instructions are stored, which instructions, when read by a processor, cause the processor to:
generate a plurality of training vectors relating to different respective historical service requests generated by respective autonomous vehicles, each of the training vectors including respective features associated with the historical request to which the training vector relates;
using the training vectors, training a model configured to generate a plurality of types of predictions relating to one or more future service requests, wherein the plurality of types of predictions includes a first type of prediction and a second type of prediction;
generate at least one updated feature vector based on newly received historical service requests;
generate a plurality of new training vectors based on the at least one updated feature vector;
retrain the model using the generated plurality of new training vectors in order to create a retrained model, wherein generating the predictions of the first type of prediction further comprises passing the first updated feature vectors to the retrained model; and using the retrained model, generating predictions of the first type of prediction at a first frequency;
using the retrained model, generating the predictions of the second type of prediction at a second frequency, wherein the first frequency is higher than the second frequency; and
outputting the generated plurality of predictions.

\* \* \* \* \*